United States Patent [19]
Ayers, Jr.

[11] 3,740,101
[45] June 19, 1973

[54] CONTROL VALVE

[75] Inventor: David T. Ayers, Jr., Birmingham, Mich.

[73] Assignee: Kelsey-Hayes Company, Romulus, Mich.

[22] Filed: Jan. 4, 1971

[21] Appl. No.: 103,596

[52] U.S. Cl. ............................. 303/6 C, 137/493.7
[51] Int. Cl. ............................................. B60t 8/26
[58] Field of Search .............. 303/6 C; 60/54.5 E; 188/349; 137/493, 493.7

[56] References Cited
UNITED STATES PATENTS

| | | | |
|---|---|---|---|
| 3,375,852 | 4/1968 | Milster | 303/6 C |
| 3,480,333 | 11/1969 | Stelzer | 303/6 C |
| 3,508,792 | 4/1970 | Bueler | 303/6 C |
| 3,586,384 | 7/1971 | Falk | 303/6 C |

Primary Examiner—Duane A. Reger
Attorney—Harness, Dickey & Pierce

[57] ABSTRACT

A control valve for connection between a split master cylinder and the front and rear brake motors or cylinders in a split fluid pressure system including metering means for impeding pressure fluid flow from the split master cylinder to the front brake cylinders at fluid pressures less than a predetermined value, and a proportioning valve for effecting an applied fluid pressure in a predetermined ratio with fluid pressure supplied thereto in excess of another predetermined value and responsive to yet another predetermined value of the supplied fluid pressure greater than one of the first mentioned predetermined values to effect an applied fluid pressure in substantially a one to one ratio therewith.

9 Claims, 4 Drawing Figures

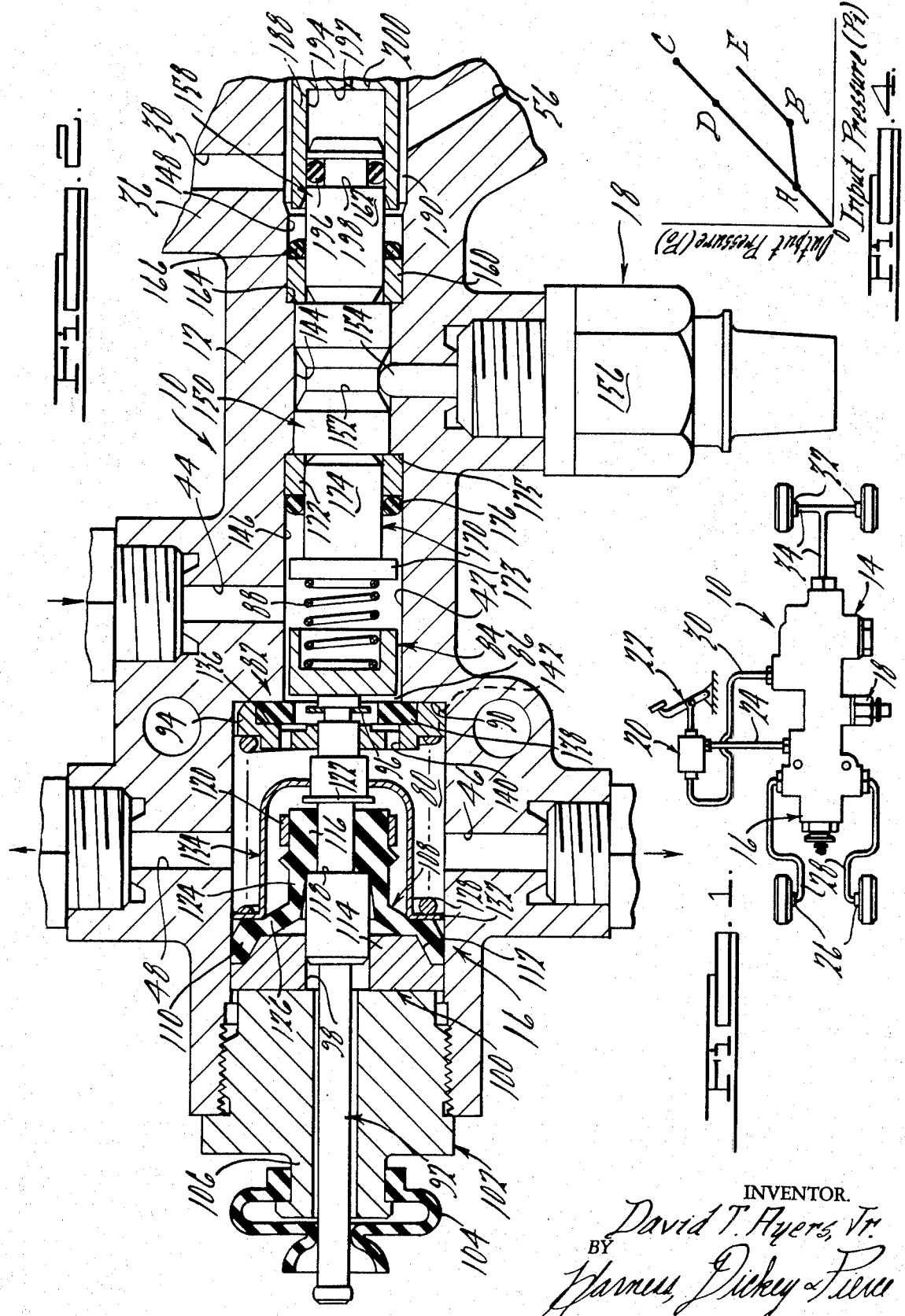

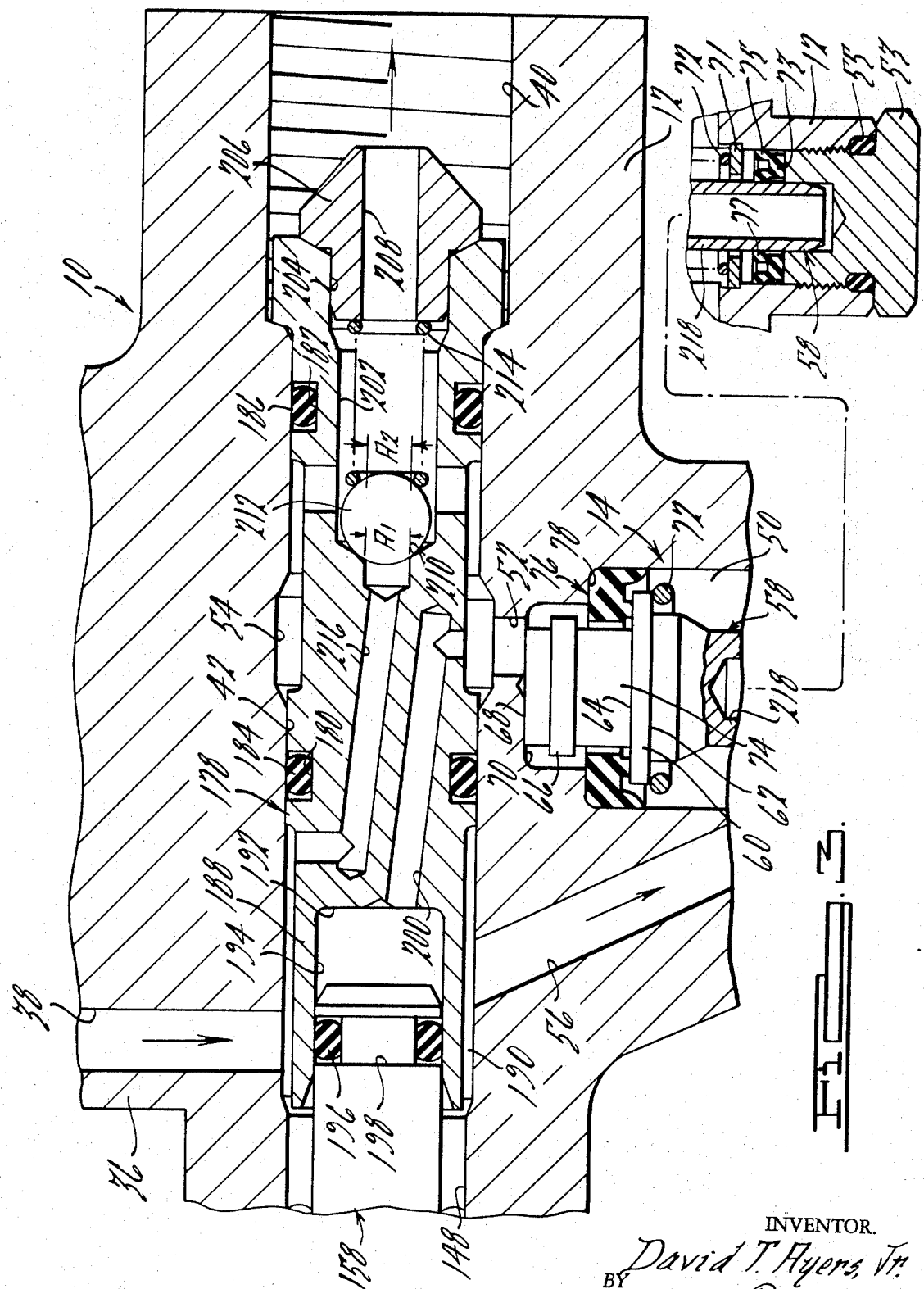

CONTROL VALVE

BACKGROUND OF THE INVENTION

In the past, vehicle split braking systems utilized well known split master cylinders to respectively energize the front and rear vehicle brakes, and when the front brakes were of the disc type and different from the usual rear drum or expanding shoe type, it was necessary to employ additional or auxiliary valving in the split braking system to effect compatible operation of both the disc type front and shoe type rear brakes. For instance, in order to prevent energization of the disc type front brakes prior to energization of the shoe type rear brakes, it has been the practice to connect a metering type fluid pressure impeding valve between the split master cylinder and the disc type front brakes. It has also been the practice to utilize in such braking systems a proportioning valve between the master cylinder and the shoe type brakes in order to effect a reduced proportional application to the rear brake cylinders with respect to the front brake cylinders where the supplied fluid pressure exceeded a predetermined value; however, one of the disadvantageous or undesirable features of such past proportioning valves has been that they continue to proportionately reduce the applied fluid pressure throughout the entire range of braking effort. Another undesirable and disadvantageous feature of past auxiliary valves for split braking systems having disc type front and shoe type rear brakes was that such metering and proportioning valves consisted of individual or separate units, with the result that the utilization of such individual valves not only increased the cost of manufacture but also the cost of assembly, both of the individual valve units per se and assembly thereof on the associated vehicles. A closely related problem resides in the the fact that the utilization of such individual valve units presented space problems since under the hood space in modern automotive vehicles is at a premium.

SUMMARY OF THE INVENTION

This invention relates generally to control valves and in particular to proportioning valves for effecting a proportional application of fluid pressure supplied thereto for use in split braking systems.

It is therefore a general object of the present invention to provide a new and improved control valve which overcomes the aforementioned disadvantageous and undesirable features of prior known control valves of the proportioning and metering type.

It is a more particular object of the present invention to provide a new and improved control valve to provide a unitized assembly comprising a "two stage" proportioning valve and a metering valve, whereby to minimize manufacturing and assembly expenses to the extreme.

It is another object of the present invention to provide a new and improved control valve of the above described character which utilizes an indicating assembly for providing either a visual or audible signal to the vehicle operator at such time as a failure occurs in either of the associated braking systems.

It is still a further object of the present invention to provide a new and improved control valve of the above described type of which is of a simple design, is economical to manufacture and convenient to assemble and install.

It is a further object of the present invention to provide a new and improved control valve of the above character which features a fluid bypass system for bypassing operation of the associated proportioning valve in the event a failure occurs in the front brake system.

Other objects and advantages of the present invention will become apparent from the following detailed description taken in conjunction with the accompanying drawing.

BRIEF DESCRIPTION OF THE DRAWING

FIG. 1 is a schematic representation of the control valve of the present invention as shown in operative association with a split vehicle braking system;

FIG. 2 is an enlarged longitudinal fragmentary cross-sectional view of a portion of the control valve of the present invention;

FIG. 3 is a longitudinal cross-sectional fragmentary view of yet another portion of the control valve of the present invention; and FIG. 4 is a graphic representation of the relationship between the supplied and applied fluid pressure during operation of the control valve of the present invention.

DETAILED DESCRIPTION OF THE PREFERRED EMBODIMENT

Referring now in detail to the drawings, a control valve assembly 10, in accordance with a preferred embodiment of the present invention, is shown generally as comprising an external housing 12 which contains a proportioning valve assembly 14, a metering valve assembly 16 and a failure indicating mechanism 18. The assembly 10 is operatively associated with a vehicle braking system including a dual master cylinder 20 which is operated by a brake pedal 22 to deliver brake fluid under pressure through a conduit 24 to the assembly 10, which fluid is then communicated to a pair of front brake cylinders 26 via conduits 28; fluid under pressure from the master cylinder 20 is also transmitted through a conduit 30 to the valve assembly 10 and then to a pair of rear brake cylinders 32 via conduits 34. Generally speaking, fluid under pressure is normally transmitted from the master cylinder 20 through the proportioning valve assembly 14 to the rear brake cylinders 32, while fluid pressure to the front brake cylinders 26 is transmitted from the master cylinder 20 through the metering valve assembly 16, as will hereinafter be described in detail.

The housing 12 is provided with an inlet boss 36 which is provided with a threaded inlet opening or passage 38 arranged to receive brake fluid from the conduit 30; the housing 12 is further provided with a threaded outlet opening or passage 40 adapted to communicate brake fluid to the rear brake cylinders 32 via the conduits 34. An elongated central cylindrical bore 42 extends through the housing 12 and functions to communicate the passages 38, 40 in a manner later to be described. The bore 42 also functions to communicate a threaded inlet bore or passage 44 with a pair of threaded outlet passages 46 and 48, the former of which is communicable with the conduit 24, while the latter of which (46, 48) are communicable with the conduits 28 and hence with the front brake cylinders 26. The housing 12 is additionally formed with an enlarged chamber 50 which is communicable at its upper end via a suitable fluid passage 52 with an enlarged diameter counterbore 54 formed at an intermediate position of the bore 42. The lower end of the chamber 50 is closed by a cap 53 and an O-ring seal 55. The chamber 50 also communicates with the bore 42 via a downwardly inclined fluid passage 56 and is further intended to house the components of the proportioning valve assembly 14, in a manner hereinafter to be described.

The proportioning valve assembly 14 may be and preferably is of the type shown and described in copending patent application, Ser. No. 532,471, filed Mar. 7, 1966, now U.S. Pat. No. 3,423,936 for Pressure Proportioning Valve, the contents of which are incorporated herein by reference as a descriptive portion of this specification. Generally speaking, the proportioning valve assembly 14 comprises an elongated slidable pressure responsive valve element or piston 58 which is formed with a radially extending flange 60 provided with a radially extending shoulder 62 on one side thereof and with a radially extending shoulder 64 in the opposite side thereof. Disposed above the flange 60 on the valve element 58 is a valve head or shoulder 66 which is of a generally annular configuration. The valve element 58 is biased upwardly so that a shoulder 68, disposed adjacent the upper end thereof, abuts against an annular shoulder 70. This is accomplished by means of a valve spring 72 which engages the shoulder 62 at its upper end. The lower end of the spring 72 is seated against a snap ring 71 which is disposed directly above a cup-type annular seal 73. The seal 73 is arranged so that as flange 75 thereof engages the wall of the chamber 50 and another flange 77 thereof engages the outer periphery of the cylindrical portion 218 (later to be described) of the valve element 58. The valve element 58 has a reduced diameter cylindrical portion 74 interposed between the shoulder 64 and the valve head 66 thereof. Extending around the portion 74 is an elastomeric annular valve member 76 which is engageable with an annular shoulder 78, the wall of the chamber 50 and the annular shoulder 64. The valve head 66 functions either to permit the flow of fluid pressure from the chamber 50 through the passage 52 or to close this fluid path and modulate fluid pressure at the passage 52 with respect to the pressure in the passage 56 and hence in the inlet passage 38, and this is accomplished through preselected vertical movement of the pressure responsive valve element 58 in response to certain preselected fluid pressures acting thereon, as described in the aforementioned patent application, Ser. No. 532,471.

Referring now in detail to the metering valve assembly 16, said assembly can be and preferably is of the type shown and described in U.S. Pat. No. 3,278,241, issued Oct. 11, 1966, the contents of which are incorporated by reference herein.

Briefly, the purpose of the metering valve 16 is to control the fluid pressure delivered to the front brake cylinders 26 wherein the front wheels are provided with disc-type brakes and the rearward wheels are provided with drum type brakes. The reason for this is that when conventional disc brakes are applied, they produce a brake torque almost immediately upon the application of hydraulic pressure, whereas drum type brakes require a substantial hydraulic pressure in order to overcome the standard relatively heavy return springs, the bias of which must be overcome before the shoes of the brakes contact the associated drums. Thus, if a vehicle is provided with drum brakes on its rear wheels and disc brakes on its front wheels, and no metering valve is utilized for the disc brakes, the disc brakes will develop high braking torque during light brake application, with the result that the disc brake shoes will tend to prematurely wear out.

The component parts of the metering valve assembly 16 are located within an enlarged diameter chamber 80 defined by the housing and located at the extreme leftward end of the longitudinally extending bore 42. As seen in FIG. 2, the chamber 80 is communicable directly with both the outlet passages 46, 48 and is communicable via the leftward end of the bore 42 with the inlet passage 44. Disposed within the chamber 80 is a pressure responsive valve assembly 82 including a valve cup 84 defining a fluid passage 86 with the bore 42. The cup 84 cooperates with a helical coil spring 88, a shoulder 90, a push rod 92, and valve plate 94 with a snap ring 96 securing the push rod and valve plate 94 together during assembly. The push rod 92 is slidably received in an opening 98 formed in a washer or plug 100 and a cap 102 retains the plug 100 within the chamber 80. A boot 104 surrounds a reduced end 106 of the cap 102, and a diaphragm 108 is provided having an outer flanged end 110 received within a groove 112 formed between the wall of the chamber 80 and an end portion 114 of the plug 100. The diaphragm 108 has a flange 116 held on the push rod 92 by a clamp 120 and another flange 122.

The valve plate 94 is held against the radial shoulder 90 by one end of a compression spring 128, the opposite end of the spring 128 engaging a flange 132 formed on a metal retainer 134 and engaging the diaphragm outer flange 110. This retainer 134 engages the rod flange 122 during assembly and holds the spring 128 against the valve plate 94. The valve plate 94 has a recess 136 adapted to receive an annular seal 138. The valve plate 94 has a plurality of axial openings 140 therethrough so that fluid entering the housing passage 44 from the master cylinder 20 and flowing through the passageway 86 around the valve cup 84 passes through the openings 140 in the valve plate 94 and enters the chamber 80. The valve plate 94 is grooved at its outer periphery forming a plurality of angularly spaced passageways 142 so that when the valve 82 is opened, fluid can pass from the passage 44 to the passage 86, through the passageways 142 and into the chamber 80.

In the event of failure in either the system to the front or rear brakes it is desired to provide a warning signal to the vehicle operator; this is done by the failure indicating assembly 18. Toward this end, the bore 42 includes a central reduced diameter bore portion 144 and oppositely located increased diameter bore portions 146 and 148. The bore portion 146 functions with the metering valve assembly 16 as previously described and hence provides an indication of master cylinder input pressure to assembly 16. The bore portion 148 communicates with bore 42 of proportioning valve assembly 14 and hence provides an indication of master cylinder input pressure to assembly 14. A detent member 150 is slidably located in bore portion 144 and has an annular groove 152 which normally receives a plunger 154 of an electrical switch 156. The switch 156 with plunger 154 in groove 152 is deactuated and hence no signal will be provided to the vehicle operator. Upon movement of member 150 either to the right or left, in response to failure of either the front or rear brake system, the plunger 154 will be moved out of groove 152 and actuate switch 156, whereby an indication, i.e., visual, audio, etc., can be provided to the vehicle operator.

A piston 158 is located in bore portion 148 and is slidably supported by an annular bushing 160 which in turn is slidably located in bore portion 148. The piston is in clearance relation with bore portion 148 and has a reduced diameter portion 162 which is slidably supported by bushing 160, and an 0-ring 166 on piston portion 162 provides a seal between bore portions 144 and 148.

The force applied on detent member 150 by piston 158 is normally opposed by a piston 170 located in bore portion 146. The piston 170 is slidably supported in an annular bushing 172 which is slidably located in bore portion 146. The piston 170 has an enlarged flange 173 in clearance relation with bore portion 146 and has a reduced diameter portion 174 slidably supported by bushing 172. The pressure in the bore portion 146 will normally maintain piston 170 in engagement with detent member 150 and bushing 172 in engagement with a shoulder 175 defined by the juncture of bore portions 144 and 146. An 0-ring 176 is located on piston portion 174 and provides a seal between bore portions 144 and 146. Note that spring 88 reacts against flange 173; however, the spring pressure is light and does not affect operation of piston 170. Thus normally the pressures in bore portions 148 and 146 will be substantially equal and hence the forces on opposite sides of detent member 150 will be equal and detent member 150 will not move. In the event of failure of the rear brake system, the pressure in bore portion 146 will exceed that in bore portion 148 whereby piston 170, and hence detent member 150, will move to the right actuating the switch 156 to provide an indication to the vehicle operator. In the event of failure of the front brake system, the detent member 150 will be moved to the left by piston 158 to provide an indication to the vehicle operator. A more detailed description of the operation and construction of the aforedescribed components will be found in U.S. Pat. No. 3,480,333, issued Nov. 25, 1969 and which is incorporated by reference herein.

Disposed within the bore 42 directly above the proportioning valve assembly 14 is an elongated, generally cylindrically shaped insert member 178 which is formed with a pair of longitudinally spaced, radially inwardly disposed grooves or recesses 180, 182 which respectively receive 0-ring sealing members 184 and 186 adapted for sealing engagement with the inner periphery of the bore 42. As seen in FIG. 3, the left end of the insert member 178 is formed with a reduced diameter portion 188 which defines with the bore 42 an annular chamber 190 which is communicable with both the passages 38 and 56, whereby to provide for fluid pressure communication therebetween. The left end of the insert member 178 is also formed with an axially inwardly extending blind bore 192 which defines an annular or cylindrical side wall 194 adapted for sealing engagement with an 0-ring member 196 carried within an annular recess 198 on the right end of the piston 158. The interior of the blind bore 192 is communicable via an internal fluid passage 200 with the enlarged diameter counterbore 54 and hence with the outlet portion of the proportioning valve assembly 14, whereby the fluid pressure at the outlet from the proportioning valve assembly 14 will act against the right end of the piston 158 in the manner hereinabove described.

The right end of the insert member 178 is also formed with an axially extending bore 202 which is formed with an enlarged diameter counterbore 204 at the extreme right end thereof. The counterbore 204 is internally threaded and is thereby adapted to threadably receive a suitable plug or fitting 206 which defines an axially extending fluid passage 208 which communicates fluid pressure from the interior of the bore 202 to the passage 40 of the housing 12. The extreme leftward end of the bore 202 is formed with a generally conical shaped valve seat 210 which is sealingly engaged by a spherical valve member 212 that is adapted to be resiliently urged into engagement with the valve seat 210 by means of a coil spring 214. When the valve member 212 is thus engaged with the valve seat 210, the member 212 is adapted to block fluid communication between the interior of the bore 202 and an elongated fluid passage 216 which extends between and communicates the bore 202 with the annular chamber 190. As will hereinafter be described in connection with the operation of the aforesaid component parts of the control valve 10 of the present invention, at such time as the valve member 212 becomes unseated, fluid communication is provided directly between the chamber 190 and the bore 202 as opposed to being communicable via the passages 56, 52 and the proportioning valve assembly 14.

The operation of the control valve 10 in providing a path for the direct transmission of pressure ($P_i$) from the passage 38 to the passage 40 ($P_o$) has already been described. As seen graphically in FIG. 4, this path remains open until the fluid pressure delivered by the master cylinder 20 attains a predetermined level. At this time the valve head 66 will close. The level of pressure at which this occurs is dependent upon the force of the spring 72 compared to the effective area of the valve element 58, acted upon by inlet fluid pressure $P_i$ in a direction opposing the force of the spring 72. This effective area is equal to the area of the cylindrical portion 218 of the valve element 58. During the lower ranges of applied brake effort the pressure acting on this effective area produces a downward force which is insufficient to overcome the force of the spring 72.

After the valve head 66 closes against the valve member 76 and the fluid pressure at the passage 38 is further increased, which produces an upward force on the valve element 58 assisting the spring 72 and tending to reopen the valve element 58 to deliver at least a portion of this increased fluid pressure to the passage 40. These opposing forces tend to create a pressure at the outlet passage 40 which increases at a lower rate than the pressure at the passage 38. The ratio of the pressures is determined by the relationship of the effective areas previously referred to and hence the fluid pressure existing in the front brake cylinders 26 will be greater than the fluid pressure in the rear brake cylinders 32 when the brakes are applied with a force greater than necessary to move the valve element 58 against the spring 72.

The input fluid pressure $P_i$ also flows through the passage 216 acting on the input area $A_1$ of the valve member 212 to establish an input force $P_iA_1$, and the output fluid pressure $P_o$ flows into the bore 202 acting on an output area $A_2$ (equal to $A_1$) of said valve member 212 to establish an output force $P_oA_2$ which is opposed to the input force $P_iA_1$ and additive to the compressive force F of the spring 214. When the input fluid pressure is increased along the line OC in the graph of FIG. 4 to values in excess of the predetermined value D, the increased input force $P_iA_1$ urges the valve member 212 rightwardly against the additive output and spring forces $P_oA_2$ and F toward a metering position disengaged from the piston valve seat 210 to establish metered pressure fluid communication between the inlet passage 38 and the outlet passage 40. In this manner, the output fluid pressure $P_o$ is increased, as shown along the line BE in the graph of FIG. 4, in a predetermined 1:1 ratio. This proportional increase in the output fluid pressure $P_o$ effects a corresponding increase in the output force $P_oA_2$, and when the increased output force $P_oA_2$ attains a value substantially equal to the additive input of spring forces $P_iA_1$ and F, the valve member 212 is moved leftwardly to its interrupting position re-engaging the valve seat 210 to again interrupt pressure fluid communication between the inlet and outlet passages 38 and 40.

A particular feature of the above described construction resides in the fact that the fluid passage 200 functions as a bypass passage to communicate fluid pressure from the inlet opening 38 directly to the outlet opening 40 without having such fluid subjected to the normal pressure modulating or proportioning operation of the proportioning valve assembly 14 at such time as a failure occurs in the front brake system. In particular, it will be seen that the 0-ring 196 on the right end of the piston 158 is axially positioned within the blind bore 192 to prevent fluid communication between the chamber 190 and fluid passage 200; however, upon preselected leftward movement of the piston member 158 in response to a failure of front brake pressure, the 0-ring 196 will move leftwardly and thereby be disengaged from the wall 194, whereby inlet fluid pressure in the chamber 190 is communicated through the blind bore 192 and fluid passage 200 to the counterbore 54, where this fluid is then communicated directly to the outlet passage 40 in the manner above described. Thus, it will be seen that at such time as a front brake pressure failure occurs, a fluid transmission passage is provided from the inlet opening 38 directly to the outlet opening 40, with the result that fluid pressure will be communicated or bypassed to the rear brake system without being subjected to the proportioning operation of the valve assembly 14.

While it will be apparent that the preferred embodiment illustrated herein is well calculated to fulfill the objects above stated, it will be appreciated that the present invention is susceptible to modification, variation and change without departing from the scope of the invention.

I claim:

1. A control valve comprising a housing having an inlet and an outlet and an elongated bore, a proportioning member movable in said housing for controlling the application of fluid pressure supplied thereto through said housing, resilient means normally urging said proportioning member toward a position in said housing establishing an applied fluid pressure at a preselected ratio with the supplied fluid pressure, said proportioning member being initially movable in response to said pressures of a predetermined value acting thereon against the force of said resilient means toward a position blocking communication between the supplied and applied fluid pressures and being thereafter further movable in response to an increase in the supplied fluid pressure in excess of the predetermined value and less than another predetermined value toward a position effecting a proportional increase in the applied fluid pressure in another predetermined ratio with the increased supplied fluid pressure, means defining a first flow passage in said housing connecting said inlet with said proportioning member, means defining a second flow passage in said housing connecting said proportioning member with said outlet, means defining a third flow passage in said housing connecting said inlet with said outlet, means at least in part within said bore defining at least part of one of said flow passages and a valve seat, valve means in said housing and movable between positions engaged with and disengaged from said valve seat for opening and closing said third passage, means normally urging said valve means toward said position closing said passage, said valve means being movable toward said position opening said passage in response to further increases in the supplied fluid pressure in excess of the other predetermined value toward a metering position establishing proportioned pressure fluid communication through said passage means between the supplied and applied fluid pressures to effect a metered increase in the applied fluid pressure in substantially the first named predetermined ratio with the supplied fluid pressure in excess of the other predetermined value when said proportioning member is in its isolating position, means defining a fourth flow passage in said housing connecting said inlet with said outlet, means within at least part of said bore and defining at least part of one of said flow passages, said last mentioned means further defining a recessed area communicable with said fourth flow passage, and piston means longitudinally movable within said bore and having a portion slidably and sealingly engageable with said recessed area, whereby said piston means normally blocks fluid flow through said fourth flow passage but is responsive to a predetermined condition to move longitudinally within said bore toward a position wherein said portion thereof is displaced relative to said recessed area to open said fourth passage in order to communicate fluid directly from said inlet to said outlet so as not to subject said fluid to the proportioning operation of said proportioning member.

2. The invention as set forth in claim 1 which includes metering means located at one longitudinal position along said bore and wherein said proportioning member is located at another longitudinal position along said bore, and which includes indicating means having means responsive to differential pressure conditions between said proportioning member and said metering means.

3. The invention as set forth in claim 2 wherein said piston means is longitudinally slidably disposed within said bore between said proportioning member and said metering means for actuating said indicating means.

4. The invention as set forth in claim 1 which includes indicating means for providing an indicator of said predetermined condition, and wherein said piston means is operable upon longitudinal movement in said bore to actuate said indicating means.

5. The invention as set forth in claim 1 which includes first and second sources of fluid pressure, one of said sources being communicable with said inlet and one end of said piston means and the other of said sources being communicable with the opposite end of said piston means.

6. The invention as set forth in claim 5 which includes indicator means actuable in response to preselected longitudinal movement of said piston means, and wherein said predetermined condition occurs upon a predetermined drop in pressure of one of said fluid pressure sources.

7. The invention as set forth in claim 1 which includes spring means for resiliently urging said valve means into sealing engagement with said valve seat.

8. The invention as set forth in claim 1 wherein said proportioning member is arranged at generally right angles to said bore and said fluid passage means.

9. The invention as set forth in claim 1 wherein the said last mentioned means comprises an insert member disposed within said housing and defining said valve seat adapted for engagement by said valve means, said insert member having said recessed area formed in one end thereof and adapted to nestingly receive one end of said piston means, said insert member further being formed with a first bore comprising said third flow passage and connecting said inlet with said valve seat, said insert member also being formed with a second bore communicating said recessed area with said outlet and comprising in part said fourth flow passage.

* * * * *